United States Patent [19]

Bretti et al.

[11] Patent Number: 4,603,465

[45] Date of Patent: Aug. 5, 1986

[54] MACHINE FOR MARKING ELECTRIC WIRES

[75] Inventors: Carlo Bretti; Franco Sermidi; Medardo Agnelli, all of Milan, Italy

[73] Assignee: Eurosab S.R.L., Milan, Italy

[21] Appl. No.: 648,313

[22] Filed: Sep. 7, 1984

[30] Foreign Application Priority Data

Sep. 8, 1983 [IT] Italy .............................. 22818 A/83

[51] Int. Cl.[4] .............................................. B23P 23/00

[52] U.S. Cl. .................................... 29/564.6; 29/235; 29/282; 29/564.1

[58] Field of Search ................ 29/33 M, 564.1, 564.2, 29/564.6, 566.2, 450, 282, 241, 235, 789, 243.57, 255; 156/86, 510; 53/585

[56] References Cited

U.S. PATENT DOCUMENTS

| | | | |
|---|---|---|---|
| 2,579,487 | 12/1951 | Frankwich | 29/564.2 |
| 2,961,027 | 11/1960 | Ullman et al. | 29/33 M |
| 3,751,902 | 8/1973 | Kingsbury et al. | 29/564.6 X |
| 4,118,915 | 10/1978 | Swenson | 29/564.6 X |
| 4,139,937 | 2/1979 | L'Homme | 29/235 X |
| 4,144,631 | 3/1979 | Fujio | 53/585 |
| 4,170,820 | 10/1979 | Klose | 29/282 |
| 4,209,882 | 7/1980 | Strickland | 29/564.6 X |
| 4,362,786 | 12/1982 | Murray | 29/564.6 X |
| 4,417,378 | 11/1983 | Brown et al. | 29/33 M |
| 4,506,430 | 3/1985 | Guzay, Jr. | 29/235 X |

FOREIGN PATENT DOCUMENTS

| | | | |
|---|---|---|---|
| 59560 | 9/1982 | European Pat. Off. | 29/564.6 |
| 1146935 | 4/1963 | Fed. Rep. of Germany | 29/564.1 |

OTHER PUBLICATIONS

Patent Abstracts of Japan, unexamined applications, E section, vol. 1, No. 129, Oct. 26, 1977, The Patent Office Japanese Government p. 5824 E 77.

*Primary Examiner*—William R. Briggs
*Attorney, Agent, or Firm*—Fleit, Jacobson, Cohn & Price

[57] ABSTRACT

A machine for automatically marking electric wires, leads and the like, by means of small rings made of plastic material, provided with symbols, and joined together by weakened breaking portions, to form a sort of flexible tube.

According to the invention, the machine comprises a marking tube magazine supported rotating on an axis, and a feeding device for moving, by one ring at a time, any one of said marking tubes towards a delivering point in which each individual ring is broken off. The machine comprises moreover a ring-gripping and tearing member, capable of automatically tearing and positioning each ring in front of a hollow needle movable from a backward position to a forward position with respect to the gripping member; and furthermore comprises a device for transferring each ring or combination of rings from the needle onto a wire, inserted into the same hollow needle.

13 Claims, 8 Drawing Figures

MACHINE FOR MARKING ELECTRIC WIRES

BACKGROUND OF THE INVENTION

This invention refers to a machine for automatically marking electric wires, conductors and the like, by means of one or a combination of several rings made of plastic material, provided with symbols in the form of numbers, letters and the like, designed to form wording or a reference in general.

There are known methods of marking the ends of electric wires, conductors and the like, by means of a set of plastic rings provided with numbers, letters and similar symbols according to the indications given in wiring diagrams. These marking rings are available in the form of continuous small tubes, in which the individual rings are joined together by weakened breaking portions. An operator holding a hollow needle, manually breaks off and slides the chosen rings onto the needle, according to the marking to be composed, inserts the end of the wire into the hollow needle and then transfers the composition of rings, thus formed, onto the wire. This manual method of procedure is extremely long and laborious, and can result in accidental errors.

A scope of this invention is to provide a machine for marking electric wires, conductors and the like, by means of the aforesaid marking rings, which automatically carries out all the fundamental operations of selecting, feeding, breaking off and threading the individual rings onto the hollow needle extremely rapidly, and in which the only operation which calls for the attention of the operator is that of inserting and removing the end of the wire from the aforesaid hollow needle.

A further scope of this invention is to provide a machine, as referred to above, which can be suitably programmed by the operator to automatically select the individual rings of the marking to be composed, and which is capable of memorizing the programmed sequence of operations so as to carry it out cyclically and repeatedly, without any assistance whatsoever from the operator.

SUMMARY OF THE INVENTION

According to the invention, a machine is provided for marking electric wires and the like, by means of marking rings, provided with numerical symbols, letters and the like, in the form of small tubes comprising rings joined together by weakened breaking portions, characterized by the fact that it comprises a rotary supported magazine for the marking tubes, means for guiding and feeding, by one ring at a time, any one of the marking tubes towards a ring breaking-off or delivering point; a ring gripping and tearing member for breaking off each individual ring in said delivering point, which member is movable from said ring delivering point in which it grips any individual ring, to a second position in which said ring is aligned with a hollow needle which is movable from a backward position to a forward position, with respect to the ring-gripping member; and means for removing the rings and transferring them onto a wire inserted into said hollow needle.

BRIEF DESCRIPTION OF THE DRAWINGS

The machine according to this invention and a number of its embodiments, will be described hereunder with reference to the accompanying drawings, in which.

DESCRIPTION OF THE INVENTION

Figure 1:
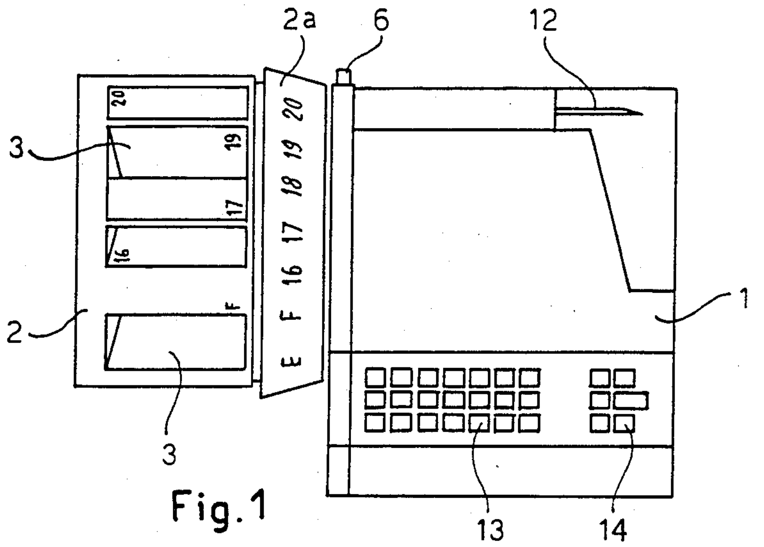
FIG. 1 shows a view of the entire machine, according to one embodiment.

According to a fully automatic embodiment, the machine comprises a structure 1 provided with a magazine 2, which is rotary supported on a horizontal axis. Inside the magazine 2 are cartridges 3, each containing a pre-established length of ring marking tube 4 made of plastic material wound on a spool and comprising a plurality of marking rings 5 joined in succession by weakened breaking portions in order to allow each ring 5 to be separated from the others by simply pulling or tearing it. Each ring 5 of each marking tube 4 bears an indication in the form of a number, letter or other symbol, so as to make it possible to compose wording or other given marking references to be threaded onto a wire, in the manner described further on. The magazine 2 is moreover, provided with an outer annular surface 2a provided with angularly spaced indications corresponding to the markings of the rings contained in the various cartridges, so that by rotating the magazine 2, either manually or automatically, it is possible to place any one of the chosen cartridges in a pre-established operative position defined by a reference index on the frame 1 of the machine, as shown schematically by 6.

Figure 7:
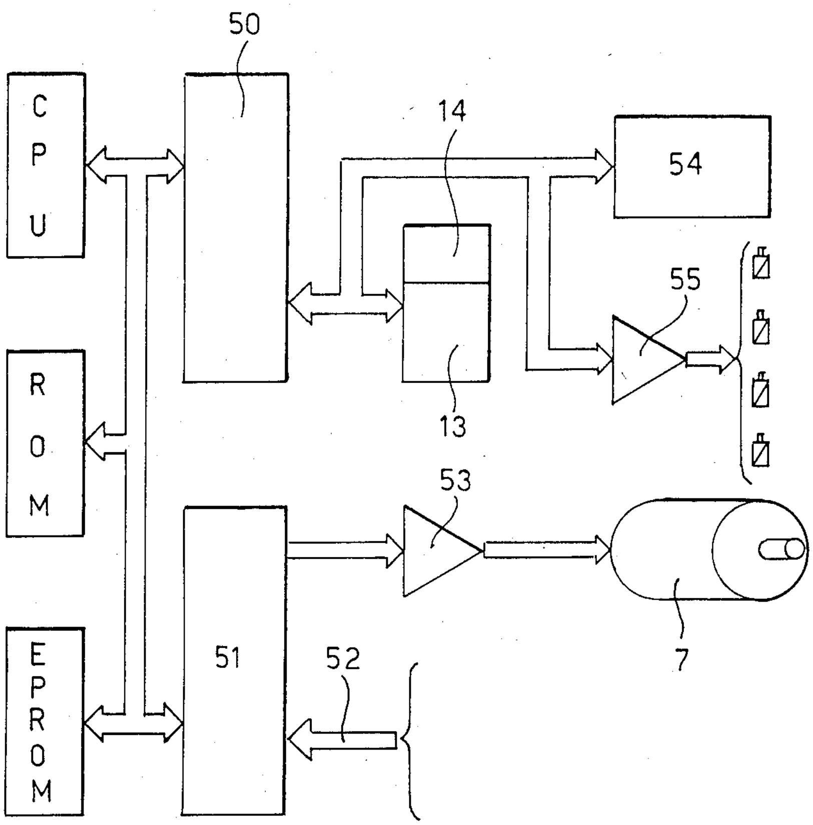
FIG. 7 shows a diagram of the control circuit of the machine of FIG. 1.

In the automatic version of the machine, the magazine 2 is rotated by means of a step motor 7, connected by the pinion 8 to a crown wheel 9 fastened to the magazine. The drive motor 7 is controlled by a suitable control circuit, which can be programmed as desired, a diagram of which is shown in FIG. 7.

The machine comprises moreover, means for guiding and feeding, by one ring at a time, any chosen one of the marking tubes 4, towards a ring delivering point in which a ring gripping and tearing device removes the first ring 5 of a tube 4 and places it in front of a hollow needle 12 which is supported so as to enable it to move forward and backward along its own axis.

Lastly, reference 13 indicates a programming push-button panel of the machine, whilst reference 14 indicates a control panel. In particular, as shown by the enlarged cross-sectional view of FIG. 2, each single tube 4 of marking rings coming from the cartridges 3, is guided parallel to the axis of the hollow needle, 12 through guiding channels 16 provided in a lid 17 which closes the front end of the magazine 2 and, respectively, through second guiding channels 18 provided in a rotor member 19 connected by a shaft 20 axially aligned with the rotary magazine 2; situated in correspondence with said rotor 19 are means for advancing or feeding the single marking tubes 4.

Figure 3:
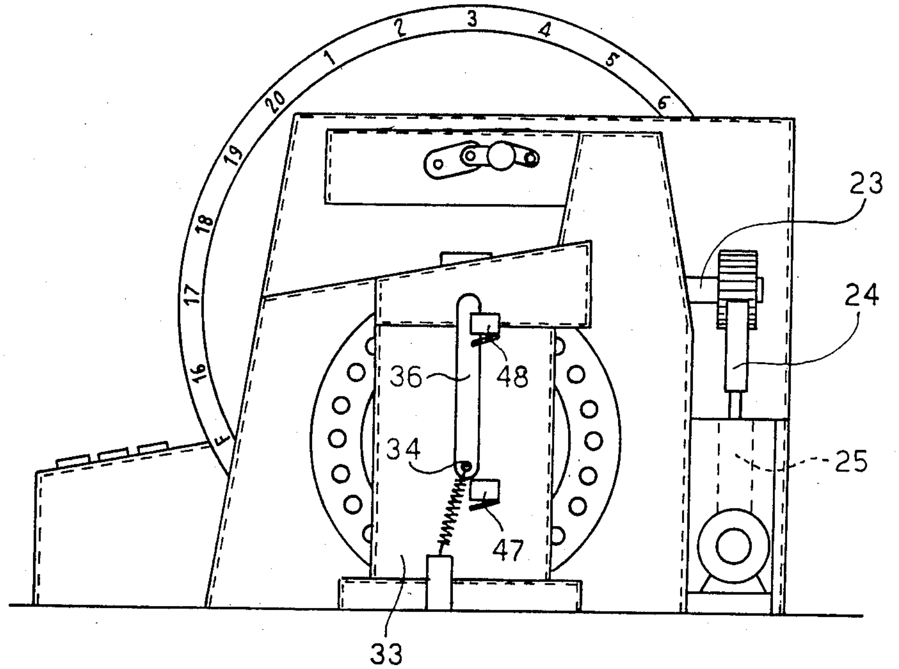
FIG. 3 shows a front view of the machine.
Figure 4:
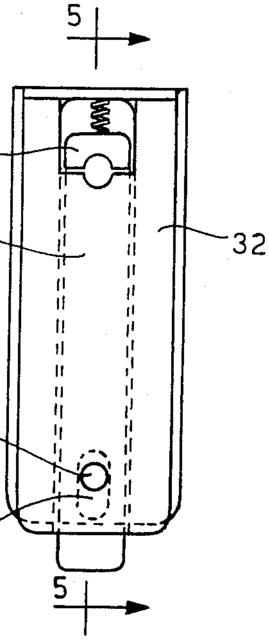
FIG. 4 shows a front view of the ring-gripping and detaching member.

In the embodiment shown, the rotor 19 is provided with an external groove 21 into which the side of each guiding channel 18 opens out; the groove 21 is penetrated by a tube-feeding member 10, in the form of a cube or square-like element 22, the angles of which push forward the tube or row of rings 5 which, at a certain point, is aligned with the same feeding member 10. The cube or feeding member 22 is held by a rotary axis 23, at right angles to the tube-guiding channels 18, which is made to rotate step-by-step by means of a rack control means 24, operated according to a pre-established sequence by a double-acting pneumatic cylinder 25 (FIG. 3).

Figure 2:
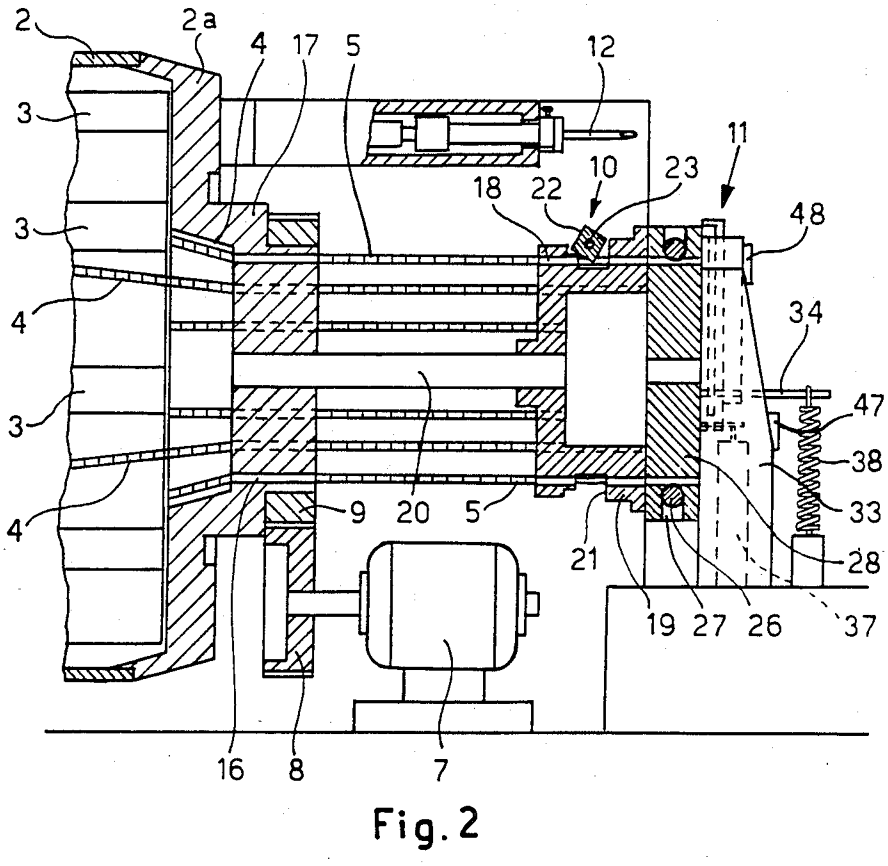
FIG. 2 shows an enlarged cross-sectional view of the machine of the previous figure.

Reference 26 in FIG. 2 indicates a retaining or braking member which frictionally acts upon the tubes 4, to prevent the individual rings 5 from accidentally slipping out of the gripping device 11 before being detached; in the case illustrated, this retaining device 26 is in the form of an elastically yielding ring seated in an appropriate groove 27 into which opens out a side of each guiding channel 18 extending into a disc 28 which closes the front of the rotor 19. It is obvious however, that the tube braking device may be made and positioned differently to that shown.

Figure 5:
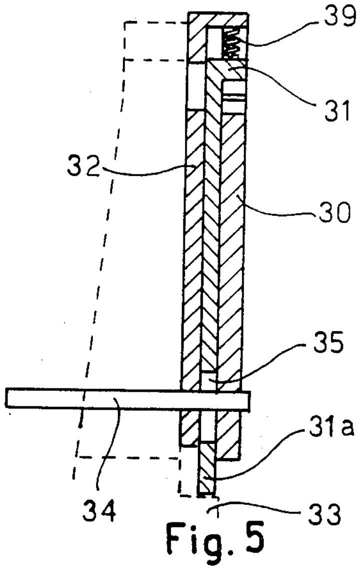
FIG. 5 shows a cross-sectional view along the line 5—5 of FIG. 4.

With reference to the figures from 2 to 5, a description will now be given of the gripping and tearing device 11 of the rings 5; this device, in the embodiment shown, is in the form of a gripper which is movable at right angles and to the front of the hollow needle 12, from a lower or backward operative position in which the jaws of the gripper are aligned with a selected marking tube 4, to an upper or forward operative position in which the jaws are aligned with the hollow needle 12. In particular, the gripper 11 comprises a first jaw 30 and a second jaw 31, opposite the first, both of which are relatively movable and sliding within a mobile plate 32 held on the front of the machine by a guiding block 33. One of the jaws, indicated by reference 30, is provided on the lower part, with a pin 34 which protrudes through an oval hole 35 in the other jaw and through a long vertical groove 36 in the block 33. A single-acting hydraulic cylinder 37 acts in opposition to a return spring 38 to move the plate 32 and the gripper 30, 31 upwards or towards the hollow needle 12, and subsequently closes the gripper itself in order to break off or tear a ring 5 from a corresponding marking tube 4. Lastly, reference 39 in FIG. 5 indicates a thrust spring which pushes the jaw 31 towards the jaw 30, clamping a ring 5 in the seat formed between said jaws, whilst reference 33 in FIG. 5 indicates a stop ledge against which the shank 31*a* of the jaw 31 comes to rest, so that said internal jaw 31 is held still whilst the other is allowed to continue its downward stroke.

Figure 6:
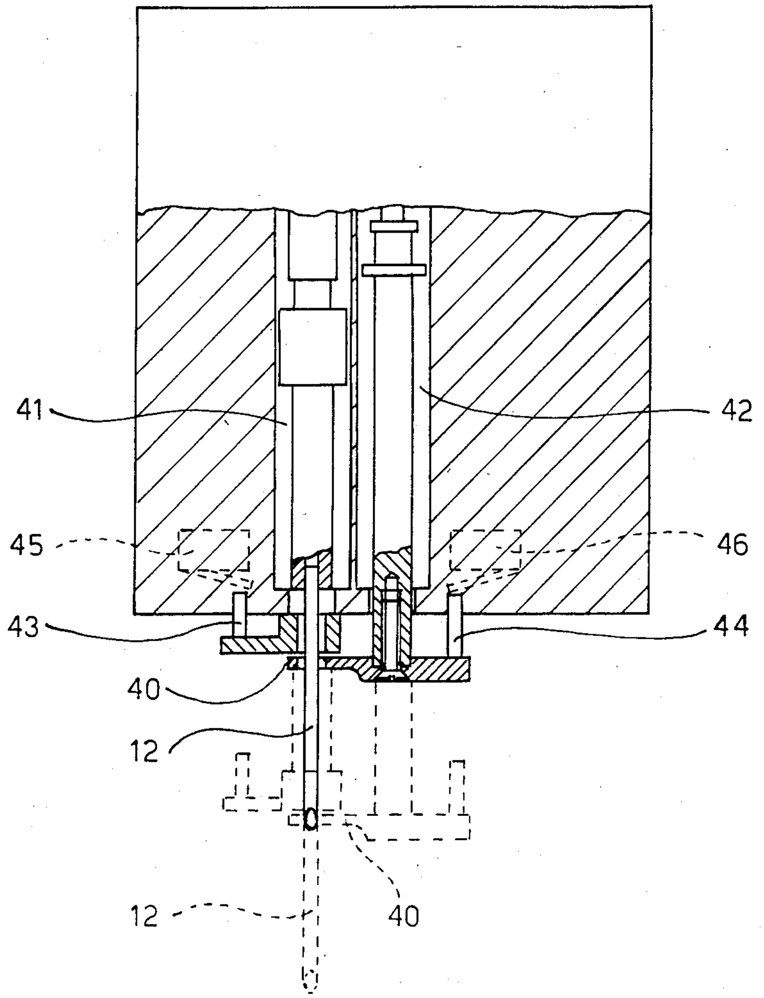
FIG. 6 shows a cross-sectional view, on two different planes, of the control member of the hollow needle and the ring ejector.

FIG. 6 of the drawings shows the detail of the hollow needle 12, the ejector 40 and their control system. In particular, the hollow needle 12 is fitted at the end of the piston rod of a double-acting cylinder 41 which controls the movement of said needle, from a backward position, shown by a continuous line, to a forward position shown by dotted lines in the same FIG. 6. An ejector 40 controlled by a double-acting cylinder 42, slides along the needle 12. Both the hollow needle 12 and the ejector 40 have lateral arms, each of which are provided with a pin 43 and 44 parallel to the axis of the control cylinders, which act upon limit switches 45 and 46; references 47 and 48 in FIG. 2 and FIG. 3 indicate further limit switches which are actuated by the pin 34 of the ring-gripping and tearing device 11.

FIG. 7 shows the diagram of the programming and control circuit of the machine; this circuit comprises the programming panel 13 and control panel 14, the data of which are transferred to a main control unit CPU, consisting for example, of an RCA COSMAC 1802 microprocessor, through an interface 50, for example, of the Mostek 1/0 Port 6522 type. The central control unit CPU, in turn, is linked to a RCA RAM 1824 memory which, from time to time, memorizes the variable data and, respectively, to a Texas Instrument EPROM 2532 memory, in which are memorized the instructions for interpreting the data provided by the RAM. Reference 51 indicates an I/O 6522 power circuit, which receives, at 52, the various control signals from the machine and which controls the step-by-step motor 7, through the power amplifier 53. Lastly, the CPU, the pushbutton panel and the interface 50 are all connected to a display and/or alarm circuit 54 as well as to an operational amplifier 55 for feeding the solenoid valves which actuate the several pneumatic control cylinders. The machine operates as follows: the data requested for marking a conductor are digited on the keyboard 13, the keys of which bear the symbols relating to the various marking rings which make up the required wording; these data are memorized in the RAM. In this condition, the needle 12 is in the backward position and the gripping and tearing device 11 is lowered with the gripper aligned to a guiding channel 18 which, at that moment, happens to be in the upper position.

Both the CPU and the EPROM contain the necessary instructions for interpreting and carrying out the desired programme. When the start key of the machine is pressed, the programme starts the step-by-step motor 7 which rotates the magazine 2 until the first marking tube 4 comes to rest in correspondence with the gripping device 11. The tube 4 of rings is then made to move forward by the device 10 until the first of the chosen rings enters the gripper 11. At this point, the programme provides a control signal which actuates the cylinder 33 which shifts the plate 32 upwards, thus closing the jaws 30 and 31, detaching a ring 5 from the tube 4 and placing it in line with the hollow needle 12.

At this point, the programme controls the forward movement of the needle 12 which, passing through the jaws of the gripper 11, enters into the first programmed ring. The needle 12, frictionally retaining the ring 5, is made to move backwards and the gripper 11 is made to descend.

The programme then operates to rotate the magazine once more, if desired, and to position a second marking tube 4 in front of the gripping device 11.

The new marking tube 4 is made to move one step forward by the device 10 and the cycle of operations is repeated as described above, in order to place second and further rings 5 on the needle 12 until the desired wording is composed. At this point, the operator inserts one end of a wire (not shown), into the hollow needle 12 and operates the cylinder 42 by means of the keyboard 14 for the forward movement of the ejector 40 which slides the rings off the needle, transferring them onto the aforesaid wire.

The operating cycle can now either be repeated automatically or by direct control, to repeat the same composition of the rings, or the machine operating programme can be changed or modified according to requirement.

Figure 8:
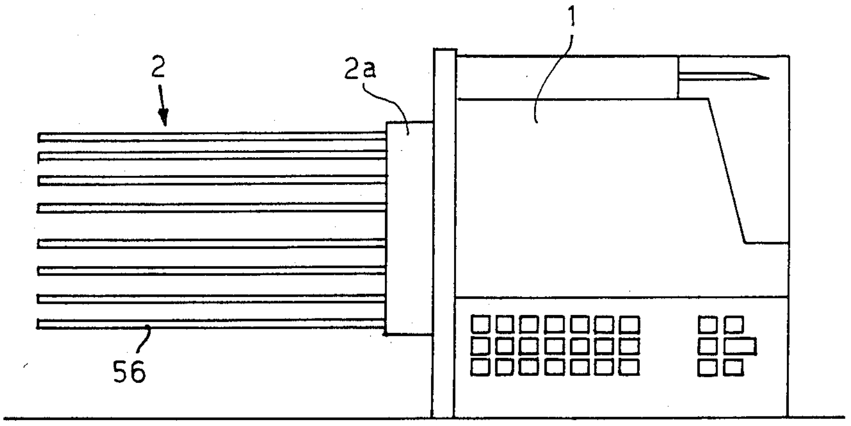
FIG. 8 shows a similar machine provided with a differently-shaped marking-tube magazine.

According to a simplified embodiment of the machine, the part concerning the automatic selection of the individual marking rings can be eliminated and the selection can be carried out by the operator himself, by rotating the magazine 2 by hand. FIG. 8 of the drawings shows a modified embodiment of the magazine 2 in which, in place of the cartridges 3, in which the single marking tubes 4 are unwound from corresponding spools, use has been made of tubular guides 56 for the marking tubes 4, arranged parallel to the axis of rotation of the magazine itself; even though they are of limited capacity, the use of tubular guides 56 makes it possible to guide the individual marking tubes 4 parallel to each other, to facilitate a precise positioning of the rings in the gripper 11.

What is claimed is:

1. A machine for marking electric wires and the like, by means of rings provided with marking symbols, said marking rings being disposed in the form of a marking tube and being joined together by weakened breaking portions, said machine comprising: a frame; a rotary supported magazine for the marking tubes and supported on the frame; means carried by the frame for guiding and feeding, by one ring at a time, any one of the marking tubes towards a ring delivery point; a hollow needle movably carried on the frame; a gripping and tearing device mounted on the frame for breaking off each single ring in said delivery point, said gripping and tearing device being movable with respect to the hollow needle, from a ring-gripping position to a second position in which the gripped ring is aligned with the needle; means carried by the frame for moving said gripping and tearing device toward and away from the needle; means carried on the frame for moving the needle along its axis, the needle being movable from a backward position to a forward position with respect to the ring-gripping and tearing device; and means for transferring the marking rings from the needle onto a wire, the end of which wire has been inserted into the hollow needle.

2. A machine as claimed in claim 1, comprising a program circuit comprising a main control and processing unit and circuits for memorizing and interpreting programmed data, said memorizing and programming circuits being connected to a step actuator of a magazine containing the marking tubes and, respectively, to an operational amplifier to control the actuators of the marking tube feeding device, the ring gripping and tearing device and the aforesaid hollow needle.

3. A machine as claimed in claim 1, in which said means for guiding the marking tubes comprise braking means acting on each single marking tube.

4. A machine as claimed in claim 3, in which said braking means comprise an elastic ring which frictionally acts on the aforesaid tubes.

5. A machine as claimed in claim 1, in which said marking-tube feeding means comprise a pushing member, rotary supported on an axis at right angles to the sliding axis of the marking tubes and control means to rotate the aforesaid pushing member step-by-step.

6. A machine as claimed in claim 5, in which said pushing member is in the form of a cube or square element.

7. A machine as claimed in claim 6, in which said pushing member is situated in a circular groove of a rotor connected to the magazine, tube-guiding channels in the rotor opening out in said annular groove.

8. A machine as claimed in claim 1, in which said ring-gripping and tearing means comprise a gripping member movable in an orthogonal plane to the aforesaid needle.

9. A machine as claimed in claim 8, in which said gripping member is in the form of a sliding gripper.

10. A machine as claimed in claim 9, in which said gripper comprises a plate movable in a guiding block; a first and a second jaw sliding parallelly and lengthwise in the aforesaid plate; one of the jaws being movable with respect to the other and pushed towards the latter by a thrust spring, and actuating means for the sliding of said plate with the gripping jaws, towards the aforesaid hollow needle.

11. A machine as claimed in claim 10, in which the gripper comprises stop means for holding one of said jaws in the open condition of the gripper.

12. A machine as claimed in claim 1, in which said magazine is in the form of a rotary drum containing a plurality of cartridges containing the marking tubes.

13. A machine as claimed in claim 1, in which said magazine comprises a plurality of tubular guides for the marking tubes, said tubular guides being arranged circumferentially and parallely to the axis of rotation of the magazine.

* * * * *